United States Patent
Park et al.

(10) Patent No.: US 10,050,479 B2
(45) Date of Patent: Aug. 14, 2018

(54) WIRELESS POWER TRANSMISSION SYSTEM BASED ON CELL DIVISION

(71) Applicant: Samsung Electronics Co., Ltd., Suwon-si (KR)

(72) Inventors: Eun Seok Park, Yongin-si (KR); Sang Wook Kwon, Seongnam-si (KR); Ki Young Kim, Yongin-si (KR); Nam Yun Kim, Seoul (KR); Dong Zo Kim, Yongin-si (KR); Yun Kwon Park, Dongducheon-si (KR); Young Ho Ryu, Yongin-si (KR); Chang Wook Yoon, Yongin-si (KR); Jin Sung Choi, Gimpo-si (KR); Young Tack Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

(21) Appl. No.: 15/218,142

(22) Filed: Jul. 25, 2016

(65) Prior Publication Data

US 2016/0336790 A1 Nov. 17, 2016

Related U.S. Application Data

(62) Division of application No. 13/615,976, filed on Sep. 14, 2012, now Pat. No. 9,413,429.

(30) Foreign Application Priority Data

Nov. 29, 2011 (KR) .......................... 10-2011-0125810

(51) Int. Cl.
*H02J 50/90* (2016.01)
*H02J 50/80* (2016.01)
(Continued)

(52) U.S. Cl.
CPC .............. *H02J 50/90* (2016.02); *H02J 50/12* (2016.02); *H02J 50/40* (2016.02); *H02J 50/80* (2016.02);
(Continued)

(58) Field of Classification Search
CPC .. H02J 7/025; H02J 50/90; H02J 50/80; H02J 50/12; H02J 50/40; H04B 5/0037; H04B 5/0075
(Continued)

(56) References Cited

U.S. PATENT DOCUMENTS 8,860,364 B2   10/2014   Low et al.
8,963,486 B2   2/2015    Kirby et al.
(Continued)

FOREIGN PATENT DOCUMENTS

KR   10-2008-0022106 A   3/2008
KR   10-2009-0131756 A   12/2009
(Continued)

OTHER PUBLICATIONS

Korean Office Action dated Jul. 17, 2017 in corresponding Korean Patent Application No. 2011-0125810 (10 pages in English and 8 pages in Korean).

*Primary Examiner* — Stacy Whitmore
(74) *Attorney, Agent, or Firm* — NSIP Law

(57) ABSTRACT

A wireless power transmission system based on cell division is provided. A communication and power control method of the wireless power transmission system, includes setting a magnetic coupling zone. The method further includes detecting a target device in the magnetic coupling zone. The method further includes transmitting a power to the target device. The method further includes adjusting an amount of the power based on a transmission efficiency of the power.

6 Claims, 10 Drawing Sheets

(51) Int. Cl.
  *H02J 50/12* (2016.01)
  *H02J 50/40* (2016.01)
  *H02J 7/02* (2016.01)
  *H04B 5/00* (2006.01)

(52) U.S. Cl.
  CPC ......... *H04B 5/0037* (2013.01); *H04B 5/0075* (2013.01); *H02J 7/025* (2013.01)

(58) Field of Classification Search
  USPC .................................................. 320/107–108
  See application file for complete search history.

(56) References Cited

U.S. PATENT DOCUMENTS

| | | |
|---|---|---|
| 9,030,160 B2 | 5/2015 | Won et al. |
| 2007/0117596 A1* | 5/2007 | Greene .............. G06K 19/0707 455/572 |
| 2010/0038970 A1 | 2/2010 | Cook et al. |
| 2010/0171369 A1 | 7/2010 | Baarman et al. |
| 2010/0181964 A1 | 7/2010 | Huggins et al. |
| 2011/0148349 A1 | 6/2011 | Kim et al. |
| 2012/0149307 A1 | 6/2012 | Terada et al. |
| 2012/0281547 A1 | 11/2012 | Kim et al. |
| 2013/0200721 A1 | 8/2013 | Kurs et al. |
| 2013/0278206 A1 | 10/2013 | Won et al. |
| 2015/0171931 A1* | 6/2015 | Won ........................ H02J 5/005 320/108 |
| 2015/0255994 A1 | 9/2015 | Kesler et al. |

FOREIGN PATENT DOCUMENTS

| | | |
|---|---|---|
| KR | 10-2010-0002171 A | 1/2010 |
| KR | 10-2011-0014641 A | 2/2011 |
| KR | 10-2011-0032260 A | 3/2011 |
| KR | 10-2011-0037999 A | 4/2011 |
| KR | 10-2011-0041792 A | 4/2011 |
| WO | WO 2007/084716 A2 | 7/2007 |
| WO | WO 2010/116441 A1 | 11/2011 |

* cited by examiner

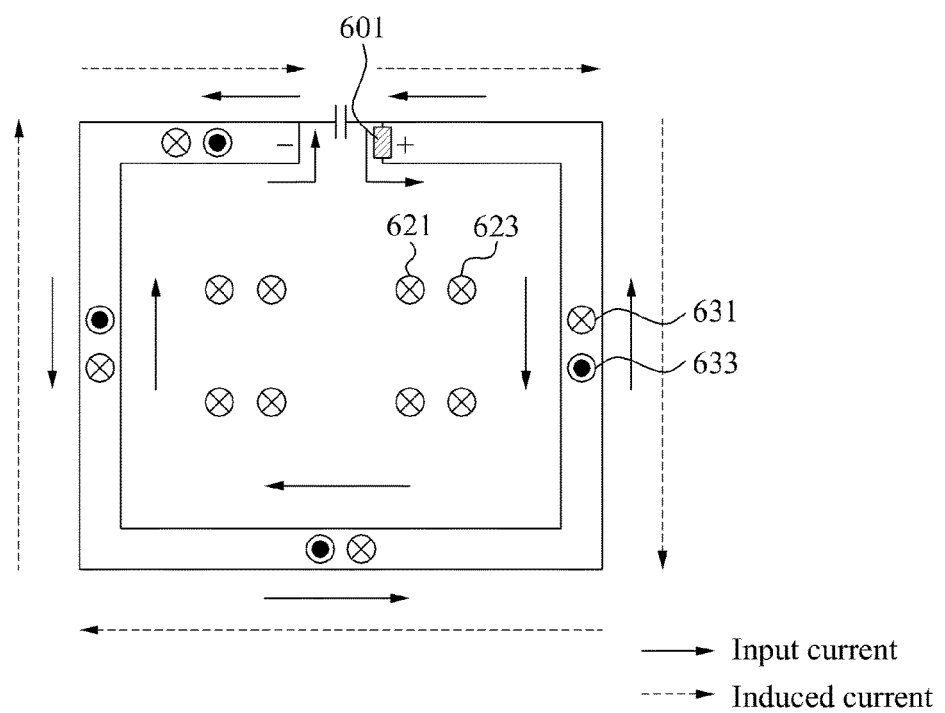

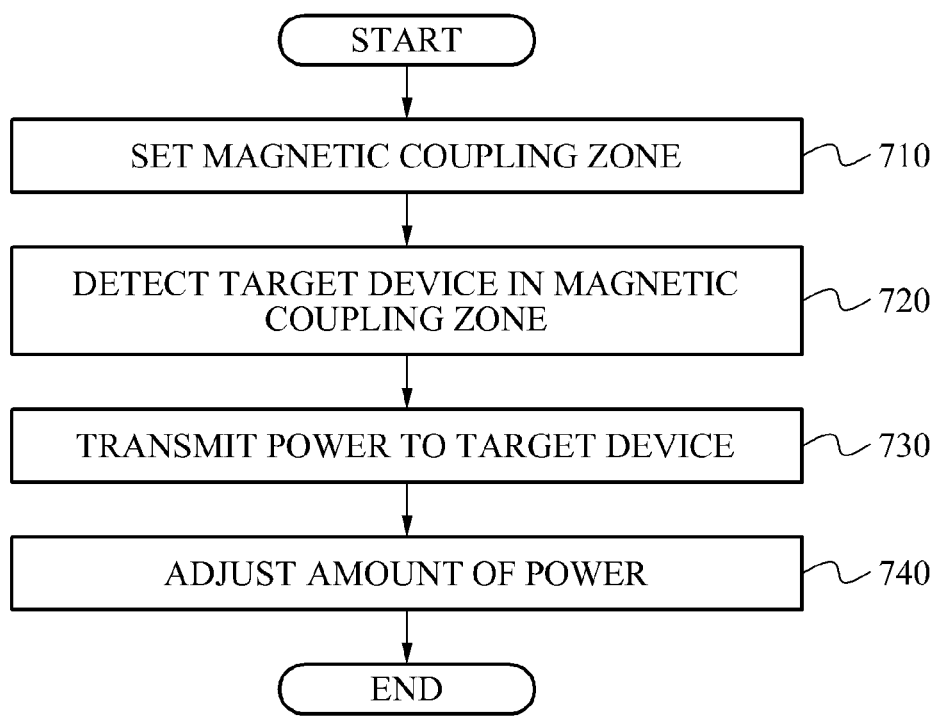

WIRELESS POWER TRANSMISSION SYSTEM BASED ON CELL DIVISION

CROSS-REFERENCE TO RELATED APPLICATION(S)

This application is a Divisional of U.S. patent application Ser. No. 13/615,976 filed on Sep. 14, 2012, which claims the benefit under 35 U.S.C. § 119(a) of Korean Patent Application No. 10-2011-0125810, filed on Nov. 29, 2011, in the Korean Intellectual Property Office, the entire disclosure of which is incorporated herein by reference for all purposes.

BACKGROUND

1. Field

The following description relates to a wireless power transmission system based on cell division.

2. Description of Related Art

Due to developments in information technology (IT), various mobile electronic products have been released, and the number of mobile electronic products owned and carried by each individual have increased. As the mobile electronic products become more varied and complicated, a problem arises in charging the mobile electronic products. Although mobile devices, electrical home appliances, and other types of mobile electronic products may transmit data wirelessly, these mobile electronic products may include inter-device power cables due to power requirements. Also, in order for a device to transmit data and power simultaneously, the device may need to include both an antenna used for communication and a system operating the antenna.

Accordingly, a wireless power transmission technology supplying a power without the need for a cable may be needed. If the wireless power transmission technology is realized, energy may be easily supplied with respect to a wired charging system being used. Realization of the wireless power transmission technology may further allow for an environment in which charging is possible at any time and location, and in which a power may be shared between devices without a power source. Also, the wireless power transmission technology may prevent environmental pollution caused by disposal of used batteries.

In a method of transmitting a power wirelessly using a resonance scheme, a transmission distance may have considerable influence on an efficiency of the transmission. Although a high transmission efficiency can be maintained in a distance less than 1 meter (m) by increasing a size of a resonator, the transmission efficiency may sharply decrease in a distance greater than 1 m. An efficient transmission distance may be increased by using a pseudo resonator and a repeater resonator. However, it is difficult to apply such resonators to a practical use.

SUMMARY

In one general aspect, there is provided a communication and power control method of a wireless power transmission system, including setting a magnetic coupling zone. The method further includes detecting a target device in the magnetic coupling zone. The method further includes transmitting a power to the target device. The method further includes adjusting an amount of the power based on a transmission efficiency of the power.

The setting of the magnetic coupling zone may include communicating with a neighboring source device. The setting of the magnetic coupling zone may further include setting the magnetic coupling zone based on the communication.

The setting of the magnetic coupling zone may include comparing the transmission efficiency to a power transmission efficiency of a neighboring source device. The setting of the magnetic coupling zone may further include setting the magnetic coupling zone based on the comparison.

The setting of the magnetic coupling zone may include setting the magnetic coupling zone based on a distance within which power transmission is possible.

The detecting of the target device may include transmitting, to the target device, a wake-up request signal for an initial communication. The detecting of the target device may further include receiving, from the target device, an acknowledgement signal in response to the wake-up request signal.

The method may further include receiving, from the target device, information on a receiving sensitivity of the wake-up request signal, or information on a receiving level of the power to be used to charge the target device, or any combination thereof. The method may further include determining the transmission efficiency based on the information on the receiving sensitivity, or the information on the receiving level, or any combination thereof.

The adjusting of the amount of the power may include transmitting, to the target device, a power reception suspension request signal requesting disconnection of a load of the target device.

In another general aspect, there is provided a power reception method of a wireless power transmission system, including receiving, from a first source device, a first charging power to be used to charge a target device, the target device located within a first magnetic coupling zone of the first source device. The method further includes receiving, from the first source device, or a second source device, or any combination thereof, the first charging power, or a second charging power to charge the target device, or any combination thereof, respectively, based on a transmission efficiency of the first charging power and a transmission efficiency of the second charging power, if the target device moves to a second magnetic coupling zone of the second source device.

In still another general aspect, there is provided a power reception method of a wireless power transmission system, including receiving, by a target device, a power from a first source device, or a second source device, or any combination thereof, based on a transmission efficiency of the power. The target device is located within a coverage area of the first source device and within a power transmission area of the second source device.

The method may further include receiving, from the first source device, a power reception suspension request signal requesting disconnection of a load of the target device. The method may further include changing a resonance characteristic of the target device, or disconnecting the load, in response to the power reception suspension request signal.

In yet another general aspect, there is provided a source device of a wireless power transmission system, including a controller configured to set a magnetic coupling zone. The controller is further configured to detect a target device in the magnetic coupling zone. The source device further includes a source resonator configured to transmit a power to the target device. The controller is further configured to adjust an amount of the power based on a transmission efficiency of the power.

The power may be used to charge the target device. The source resonator may be further configured to transmit, to the target device, a wake-up power to be used to activate the target device.

The controller may be further configured to communicate with a neighboring source device. The controller may be further configured to set the magnetic coupling zone based on the communication.

The controller may be further configured to compare the transmission efficiency to a power transmission efficiency of a neighboring source device. The controller may be further configured to set the magnetic coupling zone based on the comparison.

The controller may be further configured to set the magnetic coupling zone based on a distance within which power transmission is possible.

The source resonator may be further configured to transmit, to the target device, a wake-up request signal for an initial communication. The controller may be further configured to receive, from the target device, information on a receiving sensitivity of the wake-up request signal, or information on a receiving level of the power to be used to charge the target device, or any combination thereof. The controller may be further configured to determine the transmission efficiency based on information on the receiving sensitivity, or information on the receiving level, or any combination thereof.

The controller may be further configured to transmit, to the target device, a power reception suspension request signal requesting disconnection of a load of the target device.

In another general aspect, there is provided a target device of a wireless power transmission system, including a target resonator configured to receive, from a source device, a wake-up request signal and a power. The target device further includes a controller configured to detect a receiving sensitivity of the wake-up request signal, or a receiving level of the power, or any combination thereof. The controller is further configured to report, to the source device, the receiving sensitivity, or the receiving level, or any combination thereof.

The power may be used to charge the target device. The target resonator may be further configured to receive, from the source device, a wake-up power to be used to activate the target device.

The target device may further include a load. The target device may further include a switch unit configured to disconnect the load based on a control of the controller. The controller may be further configured to receive, from the source device, a power reception suspension request signal requesting disconnection of the load. The controller may be further configured to change a resonance characteristic of the target device, or control the switch unit to disconnect the load, in response to the power reception suspension request signal.

Other features and aspects will be apparent from the following detailed description, the drawings, and the claims.

BRIEF DESCRIPTION OF THE DRAWINGS

FIG. 6A is a diagram illustrating an example of a distribution of a magnetic field in a resonator based on feeding of a feeding unit.

FIG. 7 is a flowchart illustrating another example of a communication and power control method of a wireless power transmission system.

Figure 1:
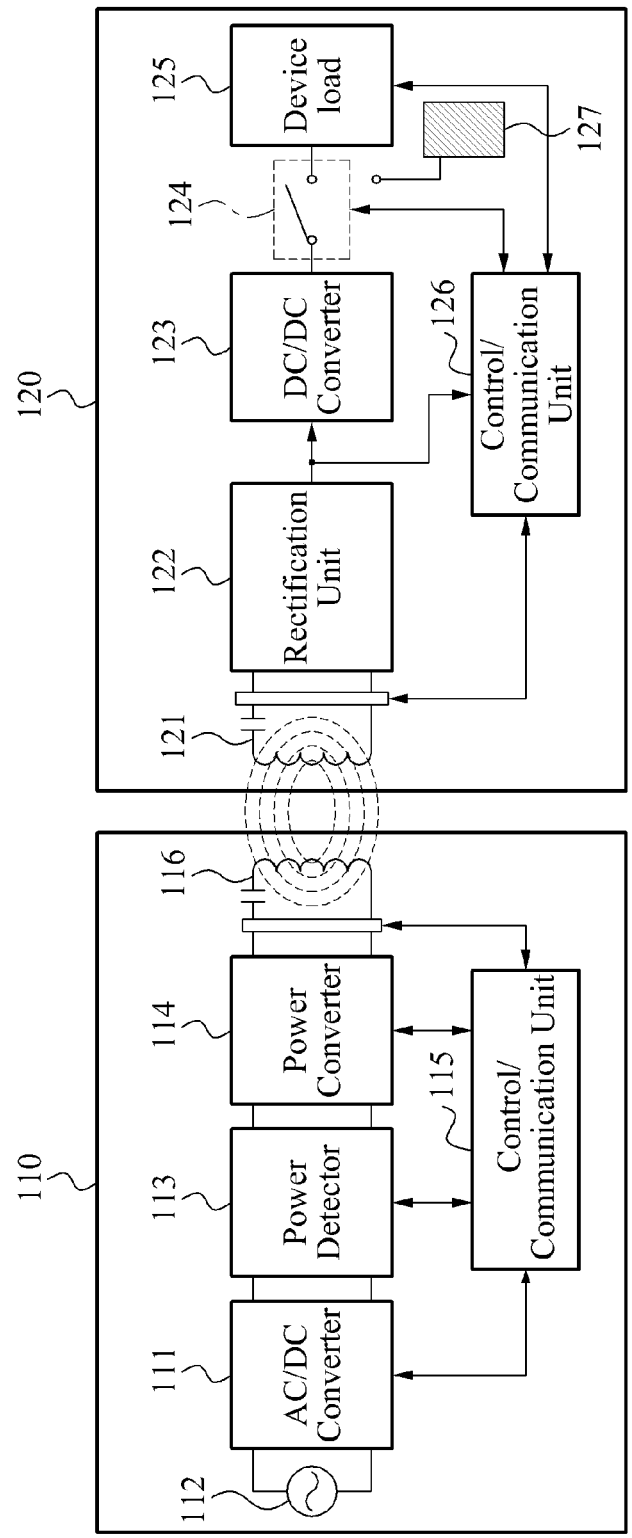
FIG. 1 is a diagram illustrating an example of a wireless power transmission system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates an example of a wireless power transmission system. The wireless power transmission system includes a source device 110 and a target device 120.

The source device 110 includes an alternating current-to-direct current (AC/DC) converter 111, a power detector 113, a power converter 114, a control and communication (control/communication) unit (e.g., a controller) 115, and a source resonator 116. The target device 120 includes a target resonator 121, a rectification unit 122, a DC-to-DC (DC/DC) converter 123, a switch unit 124, a device load 125, a control/communication unit (e.g., a controller) 126, and a dummy load 127. The target device 120 may further include a communication module (not shown). The communication module may include a communication circuit, for example, a Bluetooth circuit, a wireless local area network (WLAN) circuit, and/or any other communication circuit known to one of ordinary skill in the art.

The AC/DC converter 111 rectifies an AC voltage in a band of tens of hertz (Hz) output from a power supply 112 to generate a DC voltage. The AC/DC converter 111 may output the DC voltage of a predetermined level, or may adjust an output level of the DC voltage based on a control of the control/communication unit 115.

The power detector 113 detects an output current and an output voltage of the AC/DC converter 111, and transfers, to the control/communication unit 115, information on the detected current and the detected voltage. Additionally, the power detector 113 may detect an input current and an input voltage of the power converter 114.

The power converter 114 generates and outputs a wake-up power and a charging power to be used to charge a target device. The power converter 114 may convert the DC voltage output from the AC/DC converter 111 to an AC voltage using a resonance frequency to generate the wake-up power and the charging power. The power converter 114 may convert the DC voltage output from the AC/DC converter 111 of the predetermined level to an AC voltage using a switching pulse signal in a band of tens of kilohertz (KHz) to tens of megahertz (MHz), to generate the wake-up power and the charging power. The power converter 114 may include a power amplifier (not shown) that may amplify the DC voltage output from the AC/DC converter 111 based on the switching pulse signal.

The wake-up power may refer to a low power corresponding to 0.1 to 1 milliwatts (mW), and the charging power may refer to a high power corresponding to 1 mW to 200 Watts (W) that may be consumed by a device load of a target device. The term "charging" may refer to supplying a power to an element or a unit that may charge with the power. Also, the term "charging" may refer to supplying a power to an element or a unit that may consume the power. The term "charging power" may refer to a power consumed for an operation of a target device, or a power to charge a battery of the target device. The unit or the element may include, for example, a battery, a display device, a sound output circuit, a main processor, various types of sensors, and/or any other unit or element known to one of ordinary skill in the art.

The control/communication unit 115 may control a frequency of the switching pulse signal. Under the control of the control/communication unit 115, the frequency of the switching pulse signal may be determined.

The control/communication unit 115 may perform outband communication using a communication channel. The control/communication unit 115 may include a communication module, such as, for example, a ZigBee module, a Bluetooth module, and/or any other communication module known to one of ordinary skill in the art. The control/communication unit 115 may transmit and receive data to and from the target device 120 via the out-band communication.

The control/communication unit 115 sets a magnetic coupling zone, and detects a target device in the magnetic coupling zone. The control/communication unit 115 sets the magnetic coupling zone through communicating with another neighboring source device. The control/communication unit 115 may set the magnetic coupling zone by comparing a power transmission efficiency of the source device to a power transmission efficiency of the other neighboring source device. The control/communication unit 115 may set the magnetic coupling zone based on a distance within which power transmission is possible.

The control/communication unit 115 suspends power transmission and adjusts an amount of power to be transmitted based on a transmission efficiency of the charging power. The control/communication unit 115 determines the transmission efficiency of the charging power based on information on a receiving sensitivity of a wake-up request signal, and/or information on a receiving level of the charging power. The control/communication unit 115 transfers, to the target device 120, a power reception suspension request signal requesting disconnection of a load (e.g., the device load 125) of the target device 120.

The source resonator 116 transfers electromagnetic energy to the target resonator 121. For example, the source resonator 116 transfers, to the target device 120 in the preset magnetic coupling zone, the wake-up power and the charging power output from the power converter 114 using a magnetic coupling with the target resonator 121.

The target resonator 121 receives the electromagnetic energy from the source resonator 116. For example, the target resonator 121 receives, from the source device 110, the wake-up power to be used to activate a communication and control function, and the charging power to be used to charge the device load 125, using the magnetic coupling with the source resonator 116.

The rectification unit 122 receives an AC voltage from the target resonator 121. The rectification unit 122 rectifies the AC voltage to generate and output a DC voltage.

The DC/DC converter 123 adjusts a level of the DC voltage output from the rectification unit 122 based on a capacity of the device load 125. For example, the DC/DC converter 123 may adjust, to 3 volt (V) to 10 V, the level of the DC voltage output from the rectification unit 122.

The switch unit 124 is turned on and off under the control of the control/communication unit 126. If the switch unit 124 is turned off, the control/communication unit 115 of the source device 110 detects a reflected wave. In other words, if the switch unit 124 is turned off, the magnetic coupling between the source resonator 116 and the target resonator 121 is eliminated.

The device load 125 includes a load formed by a unit consuming power. The device load 125 may include, for example, a battery, a display device, a sound output circuit, a main processor, various types of sensors, and/or other loads known to one of ordinary skill in the art. For example, if the device load 125 includes a battery and if the switch unit 124 is turned on, the device load 125 charges the battery using the DC voltage output from the DC/DC converter 123.

The dummy load 127 may include, for example, a capacitor, a dummy resistor, or a ground. If transmission of a power to the target device 120 is not required, the switch unit 124 is turned off, and connects an output of the DC/DC converter 123 to the dummy load 127.

If the output of the DC/DC converter 123 is connected to the dummy load 127, a resonance characteristic is changed, and the magnetic coupling between the target resonator 121 and the source resonator 116 is eliminated. The resonance characteristic may correspond to, for example, a resonance frequency, a load, and/or an impedance.

The control/communication unit 126 is activated by the wake-up power. The control/communication unit 126 communicates with the source device 110, and controls an operation of the target device 120.

The control/communication unit 126 detects the receiving sensitivity of the wake-up request signal, and the receiving level of the charging power, and reports, to the source device 110 (e.g., via the target resonator 121), the receiving sensitivity of the wake-up request signal, and the receiving level of the charging power. Also, the control/communication unit 126 adjusts a resonance characteristic of the target resonator 121 in accordance with a request of the source device 110.

The rectification unit 122, the DC/DC converter 123, and the switch unit 124 may be referred to as a power supplying unit. Accordingly, the target device 120 includes the power supplying unit including the rectification unit 122, the DC/DC converter 123, and the switch unit 124, which supplies a received power (e.g., the charging power) to the device load 125. The device load 125 may be simply referred to as a load.

Figure 2:
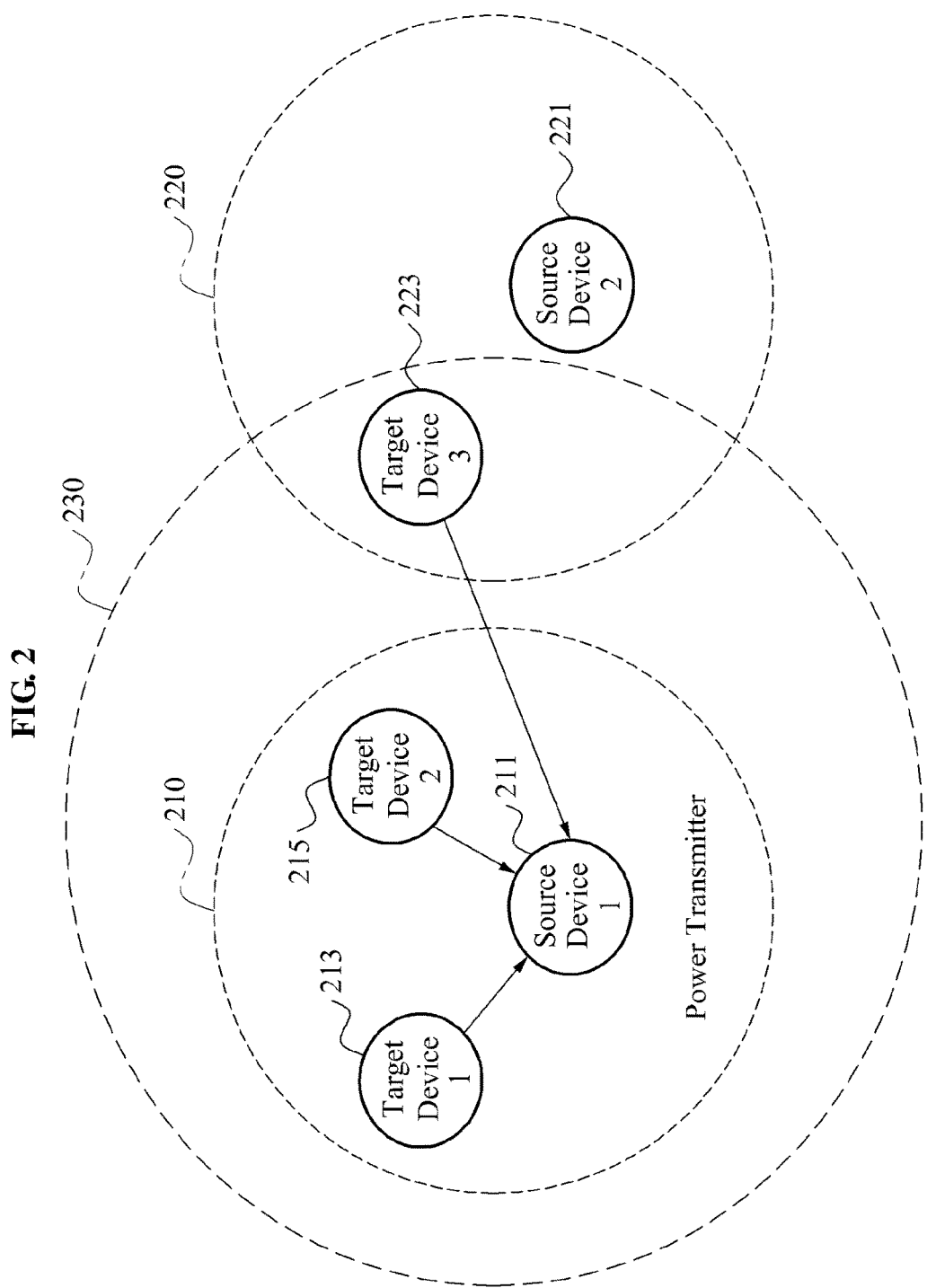
FIG. 2 is a diagram illustrating an example of a divided wireless power transmission cell.

FIG. 2 illustrates an example of a divided wireless power transmission cell. Referring to FIG. 2, a multi-source environment includes source devices, for example, a source device 1 211 and a source device 2 221. A power transmission area 210 of the source device 1 211 is set to avoid an overlap with a power transmission area 220 of the source device 2 221. If the source devices, for example, the source device 1 211 and the source device 2 221, are provided in a room environment, a power transmission distance of the source devices increases in the room environment.

As shown in FIG. 2, the wireless power transmission cell is divided into two cells, that is, the power transmission area 210 and the power transmission area 220. The power transmission area 210 of the source device 1 211 refers to a first wireless power transmission cell, and the power transmission area 220 of the source device 2 221 refers to a second wireless power transmission cell. For example, the wireless power transmission cell may be set to include a power transmission efficiency greater than 30% in a corresponding cell.

The wireless power transmission cell indicates at least one magnetic coupling zone. For example, a target device 1 213 and a target device 2 215 located in the power transmission area 210 are located in a magnetic coupling zone of the source device 1 211. Accordingly, the target device 1 213 and the target device 2 215 may form a magnetic coupling with the source device 1 211.

The wireless power transmission cell may be allocated by various schemes. For example, the wireless power transmission cell may be allocated by a user. That is, the user may allocate a partial area of a room environment to the power transmission area 210 of the source device 1 211, and may allocate another partial area of the room environment to the power transmission area 220 of the source device 2 221. The power transmission area 210 and the power transmission area 220 may be allocated based on power transmission distances of the corresponding source devices within which power transmission is possible, and/or power transmission efficiencies of the corresponding source devices at positions in the room environment. For example, if a power transmission efficiency of the source device 2 221 is higher than a power transmission efficiency of the source device 1 211 at a predetermined position, a target device may receive a power from the source device 2 221 at the predetermined position.

Also, a target device located around a boundary of the power transmission areas 210 and 220 may receive a power from the source device 1 211 and the source device 2 221, simultaneously. For example, if a coupling efficiency of the source device 1 211 at a predetermined position is 40%, and a coupling efficiency of the source device 2 221 at the predetermined position is 60%, the target device may receive 40% of a required power from the source device 1 211, and may receive 60% of the required power from the source device 2 221.

A communication and power control method of a wireless power transmission system will be described with respect to the source device 1 211. The source device 1 211 sets a magnetic coupling zone. The setting of the magnetic coupling zone includes setting an amount of power to be output from the power converter 114 of FIG. 1. That is, a power transmission distance of the source device 1 211 within which power transmission is possible is determined based on the amount of power to be output from the power converter 114.

The source device 1 211 detects a target device in the magnetic coupling zone, and wirelessly transmits, to the target device, a charging power to be used to charge the target device. The source device 1 211 suspends the power transmission, or adjusts an amount of power to be transmitted, based on a transmission efficiency of the charging power.

The source device 1 211 determines the power transmission efficiency by detecting a reflected wave and/or communicating with the target device. If the power transmission efficiency is less than a predetermined value, the source device 1 211 suspends the power transmission, or increases the amount of power to be transmitted.

The source device 2 221 refers to a neighboring source device located within a predetermined distance from the source device 1 211. The target device 1 213 and the target device 2 215 are located within the power transmission area 210 of the source device 1 211. A target device 3 223 is located within the power transmission area 220 of the source device 2 221. Accordingly, a target resonator of the target device 3 223 receives, from the source device 2 221, a wake-up power to be used to activate a communication and control function, through a magnetic coupling with the source device 2 221.

If an out-band communication scheme is used in the multi-source environment, a coverage area 230 of the source device 1 211, in which communication is possible, is formed to be broader than the power transmission area 210. Each of the source devices, for example, the source device 1 211 and the source device 2 221, accurately detects a target device existing within an area in which power transmission is possible. The target device 3 223 is located within the power transmission area 220 of the source device 2 221, and is located within the coverage area 230 of the source device 1 211. Accordingly, a communication module of the target device 3 223 is activated by the wake-up power received from the source device 2 221, and receives, from the source device 1 211, a wake-up request signal for initial communication. When the wake-up request signal is received from the source device 1 211, the communication module of the target device 3 223 transmits, to the source device 1 211, information on a receiving sensitivity of the wake-up request signal.

The source device 1 211 may need to recognize that the target device 3 223 is absent from the power transmission area 210. To do so, the source device 1 211 assigns a controlling ID to each of the target device 1 213 and the target device 2 215 that are located within the power transmission area 210. The controlling ID may correspond to an ID used by a source device to identify a target device in a charging mode.

The source device 1 211 and the source device 2 221 may set a magnetic coupling zone for each other based on communication with each other. For example, the source device 1 211 may request the source device 2 221 to reduce or increase a size of a magnetic coupling zone. Accordingly, the source device 1 211 may set the magnetic coupling zone through communication with the source device 2 221 corresponding to the neighboring source device.

Also, the source device 1 211 may set a magnetic coupling zone by comparing a power transmission efficiency of the source device 1 211 and a power transmission efficiency of the source device 2 221 corresponding to the neighboring source device. For example, if a transmission efficiency of a power transmitted from the source device 1 211 to the target device 3 223 is lower than a transmission efficiency of a power transmitted from the source device 2 221 to the target device 3 223, the source device 1 211 requests the source device 2 221 to reduce a size of a magnetic coupling zone. If the transmission efficiency of the power transmitted from the source device 1 211 to the target device 3 223 is lower than a predetermined value, the source device 1 211 suspends the power transmission.

The source device 1 211 may set a magnetic coupling zone based on a power transmission distance within which power transmission is possible. For example, the source device 1 211 may set the magnetic coupling zone by referring to a look-up table in which a power transmission distance within which power transmission is possible is matched to an amount of power to be transmitted. If a user inputs a predetermined distance value, the source device 1 211 may determine an amount of power to be output by the power converter 114 based on an amount of power to be transmitted matching the predetermined distance value in the look-up table.

When a large number of target devices are in a room environment, it may be possible to suspend power reception of a predetermined target device, or to enable only the predetermined target device to receive a power. For example, the user may adjust the source device 1 211 to suspend the power reception of the predetermined target device. In this example, the source device 1 211 may transmit, to the predetermined target device, a power reception suspension request signal requesting disconnection of a load of the predetermined target device. The predetermined target device may suspend power reception by changing a resonance characteristic through, e.g., manipulation of a switch.

Figure 3:
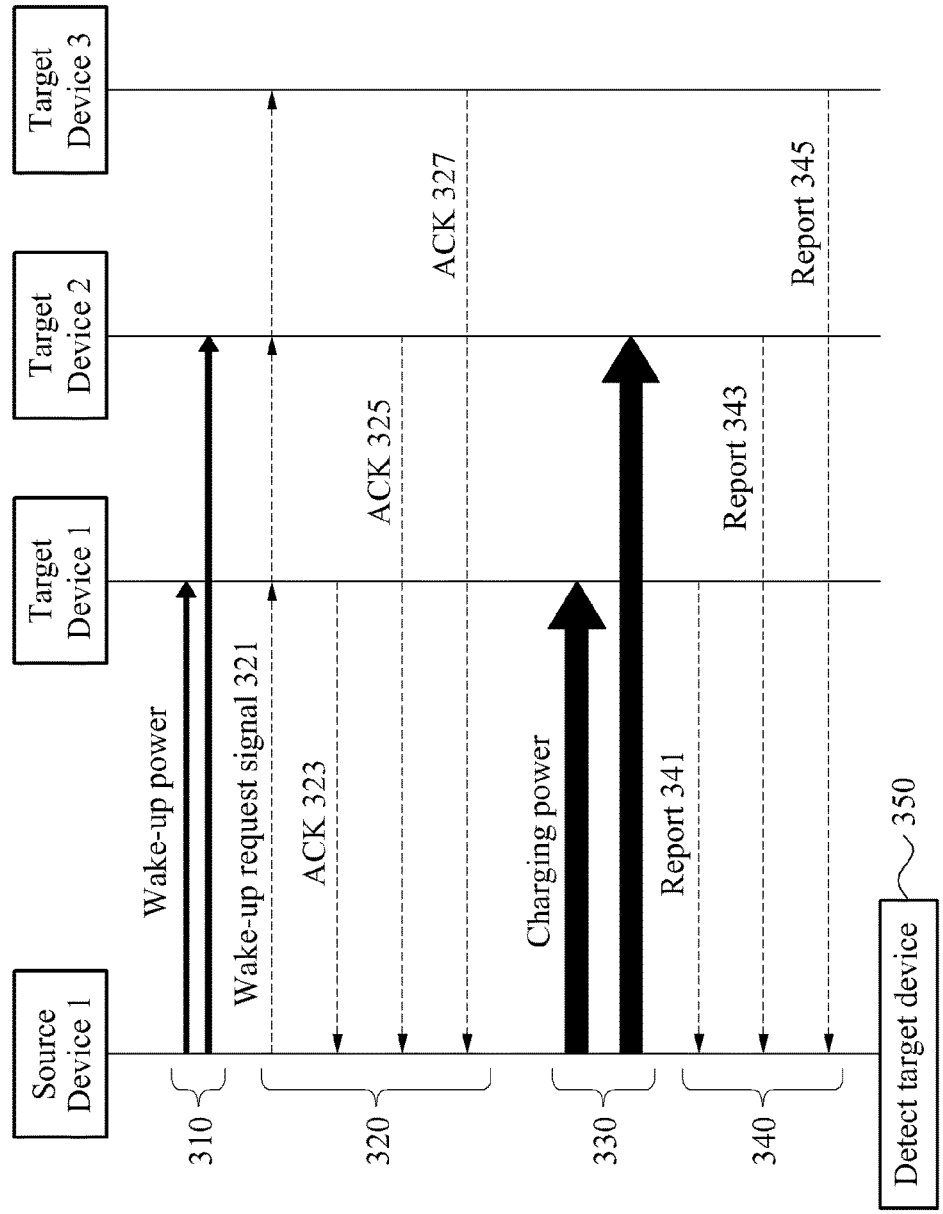
FIG. 3 is a diagram illustrating an example of a communication and power control method of a wireless power transmission system.

FIG. 3 illustrates an example of a communication and power control method of a wireless power transmission system. Referring to FIGS. 2 and 3, the target device 1 213 and the target device 2 215 are located within the power transmission area 210 of the source device 1 211, and the target device 3 223 is located within the power transmission area 220 of the source device 2 221.

In operation 310, the source device 1 211 transmits, to at least one target device, a wake-up power to be used to activate a communication and control function of the at least one target device. That is, the source device 1 211 transmits the wake-up power to the target device 1 213 and the target device 2 215. The wake-up power may be transmitted constantly in operations 310 through 340. Also, the wake-up power may be transmitted periodically. Each of the target device 1 213 and the target device 2 215 activate a communication module using the wake-up power.

In operation 320, the source device 1 211 detects at least one target device based on communication with the target device. In more detail, in operation 321, the source device 1 211 transmits, to at least one target device, a wake-up request signal for an initial communication. That is, the source device 1 211 transmits the wake-up request signal to the target device 1 213, the target device 2 215, and the target device 3 223. The target device 3 223 receives the wake-up request signal since the target device 3 223 is located within the coverage area 230 of the source device 1 211.

In examples, the wake-up request signal may include a channel fix command requesting at least one target device to maintain a communication channel selected by the source device 1 211. The wake-up request signal may include a command requesting information on an amount of power received, a command requesting a received signal strength indicator (RSSI) of a communication signal, and/or a command requesting a Link Quality Indicator (LQI), in addition to the channel fix command. The LQI refers to information on a state of communication quality. Since a communication quality may be poor even though a receiving sensitivity of a communication signal is good, a channel with high communication quality may be selected based on an LQI value.

In operations 323 through 327, each of the target device 1 213, the target device 2 215, and the target device 3 223 transmits an acknowledgement (ACK) signal to the source device 1 211 in response to the wake-up request signal. In operation 330, the source device 1 211 transmits a charging power to at least one target device. That is, the source device 1 211 transmits a charging power to the target device 1 213 and the target device 2 215. The target device 3 223 does not receive the charging power from the source device 1 211 since the target device 3 223 is outside the power transmission area 210 of the source device 1 211. However, as shown in FIG. 2, the target device 3 223 receives a charging power from the source device 2 221 since the target device 3 223 is located within the power transmission area 220 of the source device 2 221. In addition, the source device 1 211 may transmit the charging power to at least one target device based on a predetermined transmission timing.

The predetermined transmission timing may be set to a charging power transmission timing different than another charging power transmission timing of a neighboring source device located within a predetermined distance from the source device 1 211. The source device 1 211 and the source device 2 221 may perform communication to adjust respective charging power transmission timings.

In operation 340, the source device 1 211 receives, from at least one target device, information on a receiving sensitivity of the wake-up request signal, and/or information on a receiving level of the charging power. In more detail, in operations 341 through 345, the target device 1 213, the target device 2 215, and the target device 3 223 report, to the source device 1 211, the information on the receiving sensitivity of the wake-up request signal and/or the information on the receiving level of the charging power, respectively. The target device 1 213, the target device 2 215, and the target device 3 223 may also report, to the source device 1 211, information on a receiving timing of the charging power. For example, the information on the receiving timing of the charging power may include information on a receiving cycle of the charging power, information on a reception start time of the charging power, and/or information on a reception end time of the charging power.

In operation 350, the source device 1 211 detects at least one target device located within the power transmission area 210 based on, e.g., the information received from the target device. After operation 350, the source device 1 211 may determine a power transmission efficiency of the target device located within the power transmission area 210. That is, the source device 1 211 may determine the power transmission efficiency based the information on the receiving sensitivity of the wake-up request signal, and/or the information on the receiving level of the charging power, that is received from the target device.

In other words, the source device 1 211 may determine the power transmission efficiency by periodically transmitting the wake-up request signal, and periodically checking the receiving sensitivity of the wake-up request signal. Also, the source device 1 211 may periodically receive the information on the receiving level of the charging power, and may determine the power transmission efficiency based on the information on the receiving level of the charging power. For example, the power transmission efficiency may be determined based on a ratio of an amount of power output from the power converter 114 of FIG. 1 to the receiving level of the charging power.

The target device 3 223 may include a receiving level of the charging power that is less than a predetermined level, or close to a value of 0. Since a charging power transmission timing of the source device 1 211 and a charging power transmission timing of the source device 2 221 may be set to be different from each other, the target device 3 223 may not receive the charging power from the source device 1 211.

The source device 1 211 may precisely detect at least one target device within the power transmission area 210 through a wake-up time of the target device. The wake-up time may refer to a time when a control unit or a communication module of the target device is activated. That is, after a communication and control function is activated by the wake-up power, each of the target device 1 213 and the target device 2 215 may transmit, to the source device 1 211, information on a time when a control unit or a communication module is activated, e.g., a wake-up time. Upon receipt of such information, the source device 1 211 may assign control identifications (IDs) to the target device 1 213 and the target device 2 215.

The source device 1 211, the source device 2 221, the target device 1 213, the target device 2 215, and the target device 3 223 may perform out-band communication. Accordingly, a band of a resonance frequency to be used to form a magnetic coupling may be different from a band of a communication frequency to be used to transmit the wake-up request signal to at least one target device. For example, the band of the resonance frequency may range from 5 MHz to 20 MHz, and the band of the communication frequency may range from 6 MHz to 70 gigahertz (GHz).

The wake-up power and the charging power may be transmitted through a magnetic coupling, which may be formed between a source resonator of the source device 1 211 and a target resonator of at least one target device.

A power reception method of the wireless power transmission system will be described with respect to the target device 1 213. The target device 1 213 may enter a preset magnetic coupling zone of a first source device, e.g., the source device 1 211.

The target device 1 213 may receive, from the first source device, a first charging power to be used to charge the target device 1 213. When the target device 1 213 moves to a preset magnetic coupling zone of a second source device (e.g., the source device 2 215), the target device 1 213 may receive, from the second source device, a second charging power to be used to charge the target device 1 213. The target device 1 213 may receive the first charging power and/or the second charging power from the first source device and/or the second source device, respectively, based on a transmission efficiency of the first charging power received from the first source device, and a transmission efficiency of the second charging power received from the second source device.

Figure 4:
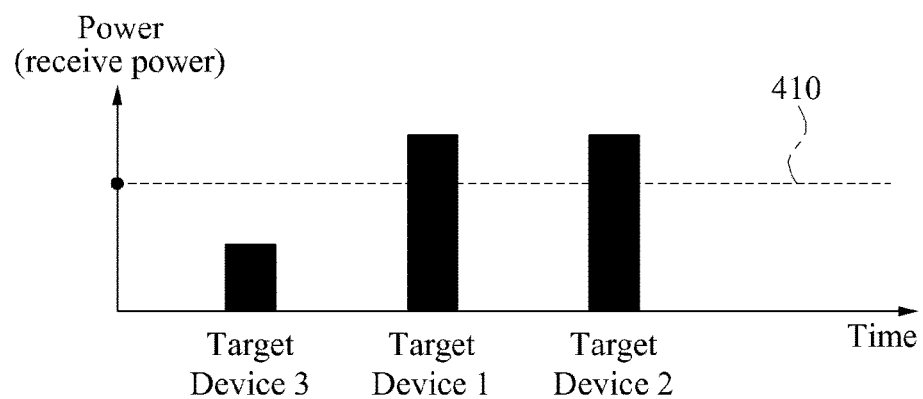
FIG. 4 is a graph illustrating an example of a criterion of detecting a target device.

FIG. 4 illustrates an example of a criterion of detecting a target device. Referring to FIG. 4, a y-axis may indicate a receiving sensitivity of a wake-up signal, or a receiving level of a charging power to be used to charge a target device (as shown). Since each of a target device 1 and a target device 2 may receive a charging power greater than a predetermined reference value 410, it may be determined that the target device 1 and the target device 2 are located within a magnetic coupling zone of a first source device. Conversely, since a target device 3 may receive a charging power less than the predetermined reference value 410, it may be determined that the target device 3 is located outside the magnetic coupling zone of the first source device. Also, since each of the target device 1 and the target device 2 may include a receiving sensitivity of a wake-up signal greater than the predetermined reference value 410, it may be determined that the target device 1 and the target device 2 are located within the magnetic coupling zone of the first source device.

Hereinafter, the term "resonator" in FIGS. 5A through 6B may include, for example, a source resonator and/or a target resonator.

Figure 5A:
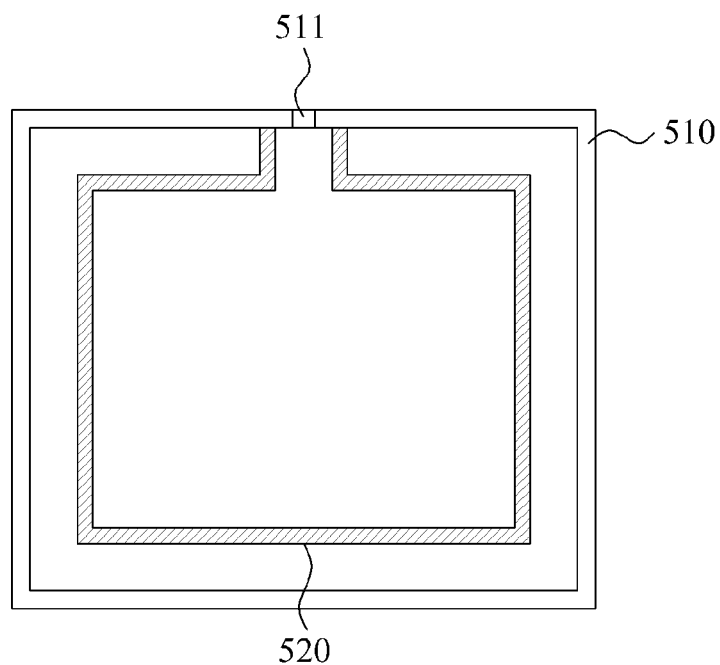
FIGS. 5A and 5B are diagrams illustrating an example of a wireless power transmitter.

FIG. 5A illustrates an example of a wireless power transmitter. The wireless power transmitter includes a resonator 510 and a feeding unit 520. The resonator 510 includes a capacitor 511. The feeding unit 520 is electrically-connected to both ends of the capacitor 511.

Figure 5B:
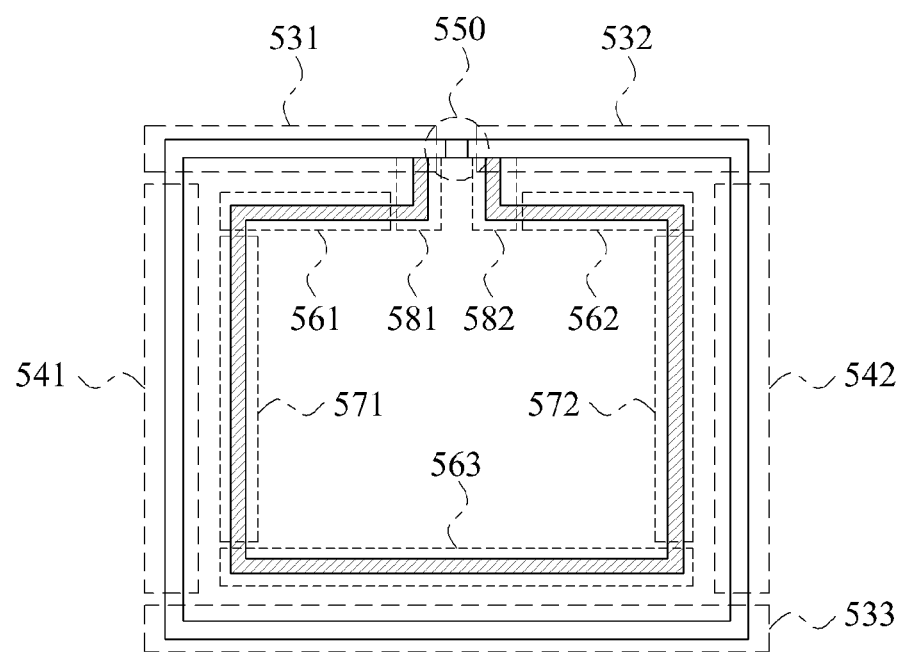

FIG. 5B illustrates, in more detail, an example of the wireless power transmitter of FIG. 5A. The resonator 510 includes a first transmission line, a first conductor 541, a second conductor 542, and at least one first capacitor 550.

The first capacitor 550 is inserted in series between a first signal conducting portion 531 and a second signal conducting portion 532 in the first transmission line, and an electric field is confined within the first capacitor 550. For example, the first transmission line may include at least one conductor in an upper portion of the first transmission line, and may also include at least one conductor in a lower portion of the first transmission line. Current may flow through the conductor disposed in the upper portion of the first transmission line, and the conductor disposed in the lower portion of the first transmission line may be electrically-grounded. Referring to FIG. 5B, a conductor disposed in an upper portion of the first transmission line is separated into and thereby refers to the first signal conducting portion 531 and the second signal conducting portion 532. A conductor disposed in a lower portion of the first transmission line refers to a first ground conducting portion 533.

As illustrated in FIG. 5B, the resonator 510 includes a two-dimensional (2D) structure. The first transmission line includes the first signal conducting portion 531 and the second signal conducting portion 532 in the upper portion of the first transmission line. In addition, the first transmission line includes the first ground conducting portion 533 in the lower portion of the first transmission line. The first signal conducting portion 531 and the second signal conducting portion 532 are disposed to face the first ground conducting portion 533. The current flows through the first signal conducting portion 531 and the second signal conducting portion 532.

Additionally, one end of the first signal conducting portion 531 is electrically-connected (i.e., shorted) to the first conductor 541, and another end of the first signal conducting portion 531 is electrically-connected to the first capacitor 550. One end of the second signal conducting portion 532 is electrically-connected to the second conductor 542, and another end of the second signal conducting portion 532 is electrically-connected to the first capacitor 550. Accordingly, the first signal conducting portion 531, the second signal conducting portion 532, the first ground conducting portion 533, and the conductors 541 and 542 are electrically-connected to each other, so that the resonator 510 includes an electrically closed-loop structure. The term "closed-loop structure" may include a polygonal structure, for example, a circular structure, a rectangular structure, and/or other types of structures that is electrically-closed.

The first capacitor 550 is inserted into an intermediate portion of the first transmission line. For example, the first capacitor 550 is inserted into a space between the first signal conducting portion 531 and the second signal conducting portion 532. The first capacitor 550 may include a shape of, for example, a lumped element, a distributed element, and/or other types of elements. For example, a distributed capacitor configured as a distributed element may include zigzagged conductor lines and a dielectric material including a high permittivity between the zigzagged conductor lines.

When the first capacitor 550 is inserted into the first transmission line, the resonator 510 may include a characteristic of a metamaterial. The metamaterial indicates a material including a predetermined electrical property that has not been discovered in nature, and thus, may include an artificially-designed structure. An electromagnetic characteristic of the materials existing in nature may include a unique magnetic permeability and/or a unique permittivity. Most materials may include a positive magnetic permeability and/or a positive permittivity.

In the case of most materials, a right hand rule may be applied to an electric field, a magnetic field, and a Poynting vector, and thus, the corresponding materials may be referred to as right handed materials (RHMs). However, the metamaterial including a magnetic permeability and/or a permittivity absent in nature may be classified into, for example, an epsilon negative (ENG) material, a mu negative (MNG) material, a double negative (DNG) material, a negative refractive index (NRI) material, a left-handed (LH) material, and/or other types of materials, based on a sign of the corresponding permittivity and/or magnetic permeability.

When a capacitance of the first capacitor 550 inserted as the lumped element is appropriately determined, the resonator 510 may include the characteristic of the metamaterial. Because the resonator 510 may include a negative magnetic permeability by appropriately adjusting a capacitance of the first capacitor 550, the resonator 510 may also be referred to as an MNG resonator. Various criteria may be applied to determine the capacitance of the first capacitor 550. For example, the various criteria may include a criterion to enable the resonator 510 to include the characteristic of the metamaterial, a criterion to enable the resonator 510 to include a negative magnetic permeability in a target frequency, a criterion to enable the resonator 510 to include a zeroth-order resonance characteristic in the target frequency, and/or other types of criteria. Based on at least one criterion among the aforementioned criteria, the capacitance of the first capacitor 550 may be determined.

The resonator 510, also referred to as the MNG resonator 510, may include a zeroth-order resonance characteristic of including, as a resonance frequency, a frequency when a propagation constant is "0". Because the resonator 510 may include the zeroth-order resonance characteristic, the resonance frequency may be independent with respect to a physical size of the MNG resonator 510. By appropriately designing the first capacitor 550, the MNG resonator 510 may sufficiently change the resonance frequency. Accordingly, the physical size of the MNG resonator 510 may not be changed.

In a near field, the electric field may be concentrated on the first capacitor 550 inserted into the first transmission line. Accordingly, due to the first capacitor 550, the magnetic field may become dominant in the near field. The MNG resonator 510 may include a relatively high Q-factor using the first capacitor 550 of the lumped element. Thus, it is possible to enhance a power transmission efficiency. For example, the Q-factor may indicate a level of an ohmic loss or a ratio of a reactance with respect to a resistor in a wireless power transmission. The efficiency of the wireless power transmission may increase according to an increase in the Q-factor.

Although not illustrated in FIG. 5B, a magnetic core may be further provided to pass through the MNG resonator 510. The magnetic core may increase a power transmission distance.

Referring to FIG. 5B, the feeding unit 520 includes a second transmission line, a third conductor 571, a fourth conductor 572, a fifth conductor 581, and a sixth conductor 582. The second transmission line includes a third signal conducting portion 561 and a fourth signal conducting portion 562 in an upper portion of the second transmission line. In addition, the second transmission line includes a second ground conducting portion 563 in a lower portion of the second transmission line. The third signal conducting portion 561 and the fourth signal conducting portion 562 are disposed to face the second ground conducting portion 563. Current flows through the third signal conducting portion 561 and the fourth signal conducting portion 562.

Additionally, one end of the third signal conducting portion 561 is electrically-connected to the third conductor 571, and another end of the third signal conducting portion 561 is electrically-connected to the fifth conductor 581. One end of the fourth signal conducting portion 562 is electrically-connected to the fourth conductor 572, and another end of the fourth signal conducting portion 562 is electrically-connected to the sixth conductor 582. The fifth conductor 581 is electrically-connected to the first signal conducting portion 531, and the sixth conductor 582 is electrically-connected to the second signal conducting portion 532. The fifth conductor 581 and the sixth conductor 582 are electrically-connected in parallel to both ends of the first capacitor 550. The fifth conductor 581 and the sixth conductor 582 are used as input ports to receive an RF signal.

Accordingly, the third signal conducting portion 561, the fourth signal conducting portion 562, the second ground conducting portion 563, the third conductor 571, the fourth conductor 572, the fifth conductor 581, the sixth conductor 582, and the resonator 510 are electrically-connected to each other, so that the resonator 510 and the feeding unit 520 include an electrically closed-loop structure. When the RF signal is received via the fifth conductor 581 or the sixth conductor 582, an input current flows in the feeding unit 520 and the resonator 510, a magnetic field is formed due to the input current, and a current is induced in the resonator 510 due to the formed magnetic field. A direction of the input current flowing in the feeding unit 520 is identical to a direction of the induced current flowing in the resonator 510, and thus, a strength of a total magnetic field increases in a center of the resonator 510, but decreases in outer edges of the resonator 510.

An input impedance is determined based on an area of a region between the resonator 510 and the feeding unit 520, and accordingly, a separate matching network used to match the input impedance to an output impedance of a power amplifier may not be required. For example, even when the matching network is used, the input impedance may be determined by adjusting a size of the feeding unit 520, and thus, a structure of the matching network may be simplified. The simplified structure of the matching network may minimize a matching loss of the matching network.

The second transmission line, the third conductor 571, the fourth conductor 572, the fifth conductor 581, and the sixth conductor 582 form the same structure as the resonator 510. In an example in which the resonator 510 includes a loop structure, the feeding unit 520 may also include a loop structure. In another example in which the resonator 510 includes a circular structure, the feeding unit 520 may also include a circular structure.

FIG. 6A illustrates an example of a distribution of a magnetic field in a resonator based on feeding of a feeding unit. FIG. 6A more briefly illustrates the resonator 510 and the feeding unit 520 of FIG. 5A.

A feeding operation in a wireless power transmission refers to supplying a power to a resonator, or refers to supplying AC power to a rectification unit. FIG. 6A illustrates a direction of an input current flowing in the feeding unit, and a direction of an induced current induced in the resonator. Additionally, FIG. 6A illustrates a direction of a magnetic field formed due to the input current, and a direction of a magnetic field formed due to the induced current.

A fifth conductor or a sixth conductor of the feeding unit may be used as an input port 610. The input port 610 receives an RF signal output from a PA. The PA may increase and decrease an amplitude of the RF signal, on demand of a target device. The RF signal is displayed in the form of the input current flowing in the feeding unit. The input current flows in a clockwise direction in the feeding unit, along a transmission line of the feeding unit. The fifth conductor is electrically-connected to the resonator, e.g., a first signal conducting portion of the resonator. Accordingly, the input current flows in the resonator, as well as, in the feeding unit. The input current flows in a counterclockwise direction in the resonator. The input current flowing in the resonator causes a magnetic field to be formed so that an induced current is generated in the resonator due to the magnetic field. The induced current flows in a clockwise direction in the resonator. The induced current transfers energy to a capacitor of the resonator, and a magnetic field is formed due to the induced current. The input current flowing in the feeding unit and the resonator is indicated by a solid line of FIG. 6A, and the induced current flowing in the resonator is indicated by a dotted line of FIG. 6A.

A direction of a magnetic field formed due to current may be determined based on the right hand rule. As illustrated in FIG. 6A, within the feeding unit, a direction 621 of the magnetic field formed due to the input current flowing in the feeding unit is identical to a direction 623 of the magnetic field formed due to the induced current. Accordingly, a strength of a total magnetic field increases within the feeding unit.

Additionally, in a region between the feeding unit and the resonator, a direction 633 of the magnetic field formed due to the input current flowing in the feeding unit includes a phase opposite to a phase of a direction 631 of the magnetic field formed due to the induced current. Accordingly, the strength of the total magnetic field decreases in the region between the feeding unit and the resonator.

Typically, a strength of a magnetic field decreases in a center of a resonator with a loop structure, and increases in outer edges of the resonator. However, referring to FIG. 6A, the feeding unit is electrically-connected to both ends of the capacitor of the resonator, and accordingly, the induced current flows in the same direction as the input current of the feeding unit. Since the induced current flows in the same direction as the input current of the feeding unit, the strength of the total magnetic field increases within the feeding unit, and decreases outside the feeding unit. As a result, the strength of the total magnetic field increases in a center of the resonator with the loop structure, and decreases in the outer edges of the resonator, due to the feeding unit. Thus, the strength of the total magnetic field is equalized within the resonator.

Additionally, a power transmission efficiency of transferring a power from the resonator to a target resonator is proportional to the strength of the total magnetic field formed in the resonator. When the strength of the total magnetic field increases in the center of the resonator, the power transmission efficiency also increases.

Figure 6B:
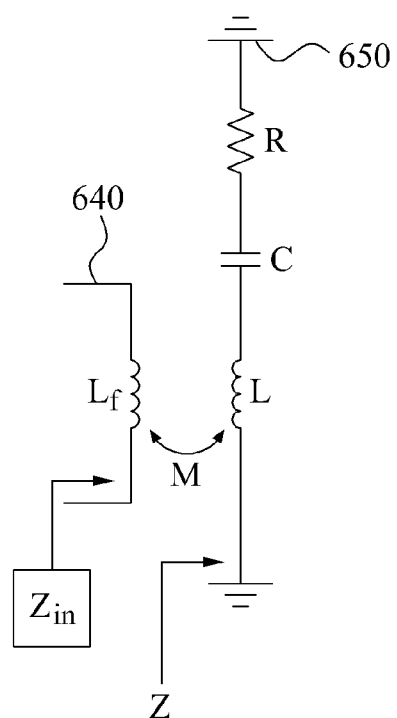
FIG. 6B is a diagram illustrating examples of equivalent circuits of a feeding unit and a resonator.

FIG. 6B illustrates an equivalent circuit of a feeding unit 640, and an equivalent circuit of a resonator 650. An input impedance $Z_{in}$ viewed in a direction from the feeding unit 640 to the resonator 650 may be computed, as given in Equation 1.

$$Z_{in} = \frac{(\omega M)^2}{Z} \quad \text{[Equation 1]}$$

In Equation 1, M denotes a mutual inductance between the feeding unit 640 and the resonator 650, $\omega$ denotes a resonance frequency between the feeding unit 640 and the resonator 650, and Z denotes an impedance viewed in a direction from the resonator 650 to a target device. The input impedance $Z_{in}$ is proportional to the mutual inductance M. Accordingly, the input impedance $Z_{in}$ may be controlled by adjusting the mutual inductance M. The mutual inductance M may be adjusted based on an area of a region between the feeding unit 640 and the resonator 650. The area of the region between the feeding unit 640 and the resonator 650 may be adjusted based on a size of the feeding unit 640. The input impedance $Z_{in}$ may be determined based on the size of the feeding unit 640, and thus, a separate matching network may not be required to perform impedance matching with an output impedance of a PA.

FIG. 7 is a flowchart illustrating another example of a communication and power control method of a wireless power transmission system. For example, the method may be performed by the source device 110 of FIG. 1, the source device 1 211 of FIGS. 2 through 3, and the source device 2 221 of FIGS. 2 through 3, hereinafter referred to as the source device.

In operation 710, the source device sets a magnetic coupling zone. For example, the setting of the magnetic coupling zone may include communicating with a neighboring source device, and setting the magnetic coupling zone based on the communication. In another example, the setting of the magnetic coupling zone may include comparing a power transmission efficiency of the source device to a power transmission efficiency of a neighboring source device, and setting the magnetic coupling zone based on the comparison. In still another example, the setting of the magnetic coupling zone may include setting the magnetic coupling zone based on a distance within which power transmission is possible.

In operation 720, the source device detects a target device in the magnetic coupling zone. For example, the detecting of the target device may include transmitting, to the target device, a wake-up request signal for an initial communication, and receiving, from the target device, an acknowledgement signal in response to the wake-up request signal. That is, the source device may detect the target device in the magnetic coupling zone based on the reception of the acknowledgement signal from the target device.

In operation 730, the source device transmits a power to the target device. In operation 740, the source device adjusts an amount of the power based on a transmission efficiency of the power. To determine the transmission efficiency of the power, the source device may receive, from the target device, information on a receiving sensitivity of the wake-up request signal, and/or information on a receiving level of the power to be used to charge the target device. The source device may determine the transmission efficiency based on the information on the receiving sensitivity, and/or the information on the receiving level. In another example, the adjusting of the amount of the power may include transmitting, to the target device, a power reception suspension request signal requesting disconnection of a load of the target device.

Figure 8:
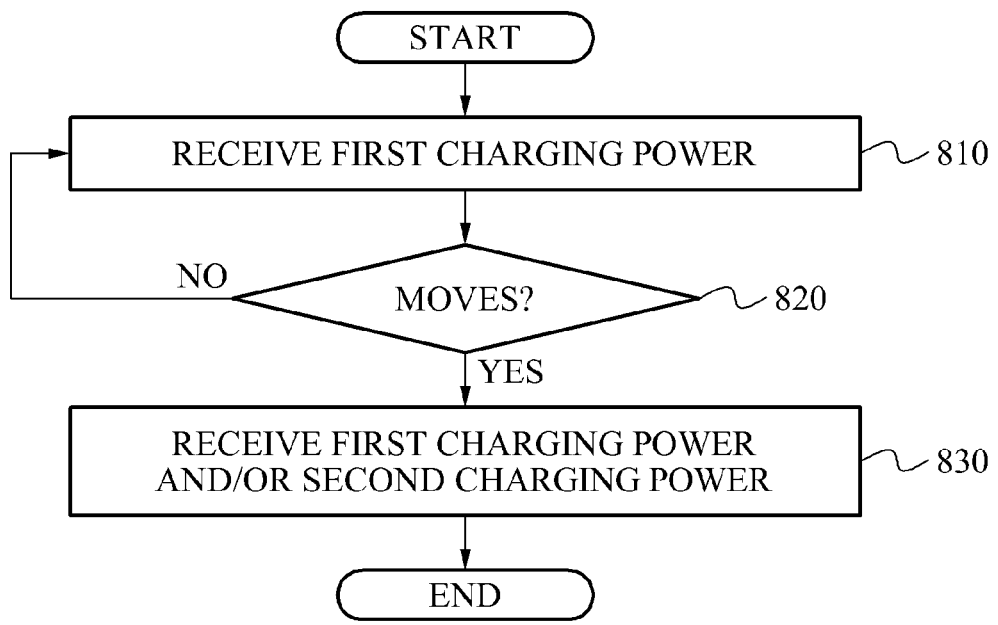
FIG. 8 is a flowchart illustrating an example of a power reception method of a wireless power transmission system.

FIG. 8 is a flowchart illustrating an example of a power reception method of a wireless power transmission system. For example, the method may be performed by the target device 120 of FIG. 1, the target device 1 213 of FIGS. 2 through 3, the target device 2 215 of FIGS. 2 through 3, and the target device 3 223 of FIGS. 2 through 3, hereinafter referred to as the target device.

In operation 810, the target device receives, from a first source device, a first charging power to be used to charge the target device, since the target device is located within a first magnetic coupling zone of the first source device. In operation 820, the target device determines whether it moves to a second magnetic coupling zone of a second source device. If the target device does not move to the second magnetic coupling zone, the target device continues to perform operation 810 until the charging of the target device is complete. Otherwise, the target device performs operation 830.

In operation 830, the target device receives, from the first source device and/or the second source device, the first charging power and/or a second charging power to charge the target device, respectively, based on a transmission efficiency of the first charging power and a transmission efficiency of the second charging power. The first sand second source devices may determine the transmission efficiencies of the first and second charging powers, respectively.

In addition, the target device may receive, from the first source device, a power reception suspension request signal requesting disconnection of a load of the target device. Accordingly, the target device may change a resonance characteristic of the target device, or disconnect the load, in response to the power reception suspension request signal.

According to the teachings above, there is provided a wireless power transmission system, which efficiently transmits a power in an area in which wireless power transmission is applicable in reality, such as, a room environment or an office environment. A range of application of the wireless power transmission may be expanded from a pad type charging scheme to an indoor environment.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. For example, the software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments to accomplish the examples disclosed herein can be easily construed by programmers skilled in the art to which the examples pertain based on and using the flow diagrams and block diagrams of the figures and their corresponding descriptions as provided herein.

As a non-exhaustive illustration only, a device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A source device of a wireless power transmission system, comprising:
one or more processors configured to:
compare a transmission efficiency to a target device from the source device and a transmission efficiency to the target device from another neighboring source device, through communicating with the target device and the another neighboring source device,
set a wireless power transmission cell based on the comparison, and
detect the target device in the wireless power transmission cell; and
a source resonator configured to transmit a power to the target device,
wherein the one or more processors are further configured to adjust an amount of the power based on the transmission efficiency of the power.

2. The source device of claim 1, wherein:
the power is to be used to charge the target device; and
the source resonator is further configured to transmit, to the target device, a wake-up power to be used to activate the target device.

3. The source device of claim 1, wherein the one or more processors are further configured to:
- communicate with the another neighboring source device; and
- set the wireless power transmission cell based on the communication.

4. The source device of claim 1, wherein the one or more processors are further configured to:
- set the wireless power transmission cell based on a distance within which power transmission is possible.

5. The source device of claim 1, wherein:
- the source resonator is further configured to transmit, to the target device, a wake-up request signal for an initial communication; and
- the one or more processors are further configured to
  - receive, from the target device, information on a receiving sensitivity of the wake-up request signal, or information on a receiving level of the power to be used to charge the target device, or any combination thereof, and
  - determine the transmission efficiency based on information on the receiving sensitivity, or information on the receiving level, or any combination thereof.

6. The source device of claim 1, wherein the one or more processors are further configured to:
- transmit, to the target device, a power reception suspension request signal requesting disconnection of a load of the target device.

* * * * *